June 30, 1942.   D. B. MASON ET AL   2,288,569
PROTECTION OF ECONOMIC CROPS
Filed Oct. 31, 1938   2 Sheets-Sheet 1
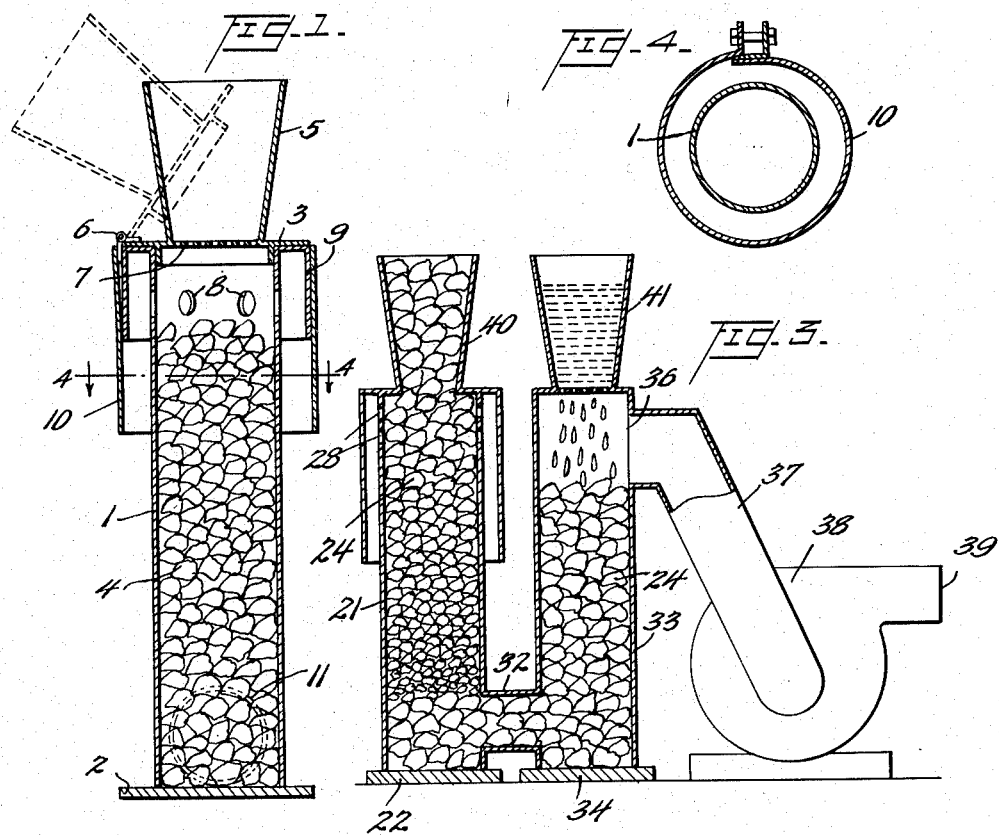
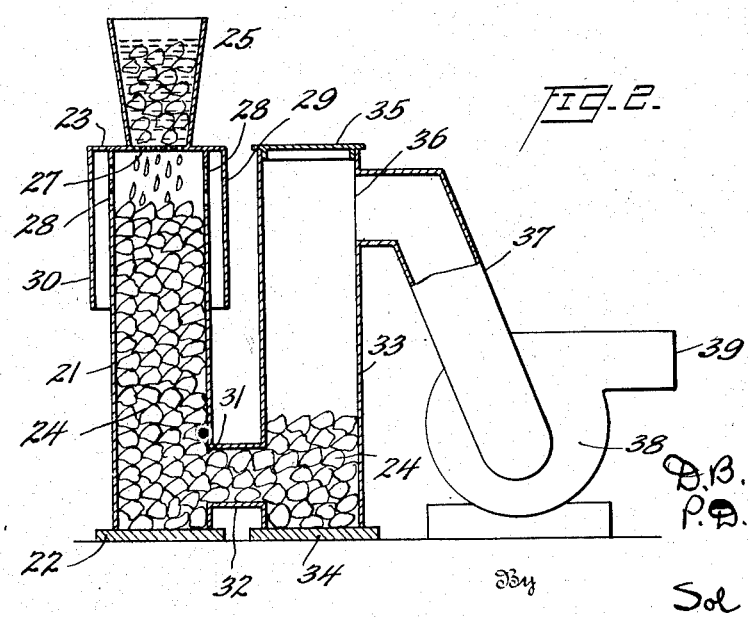
Inventor
D.B. Mason
P.D. Peterson
By Sol Shapiro
Attorney

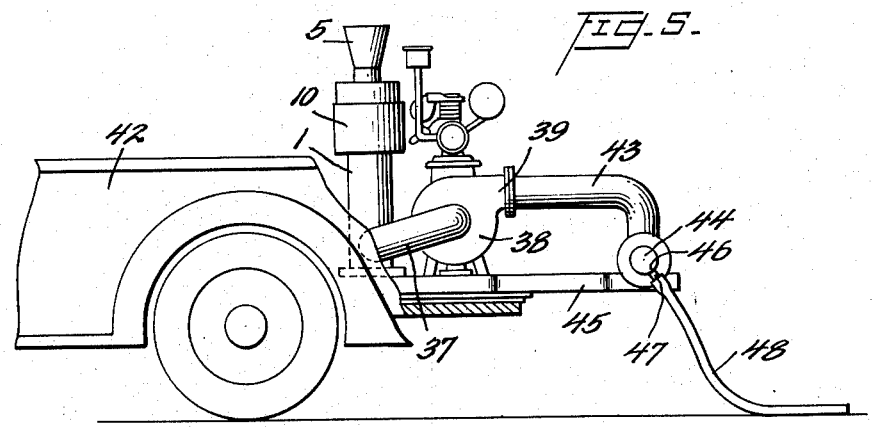
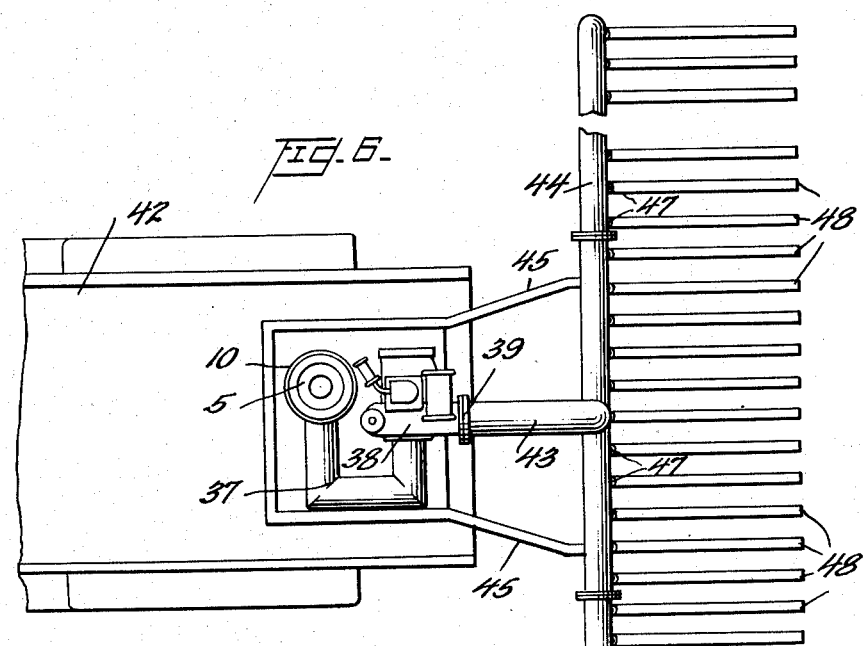
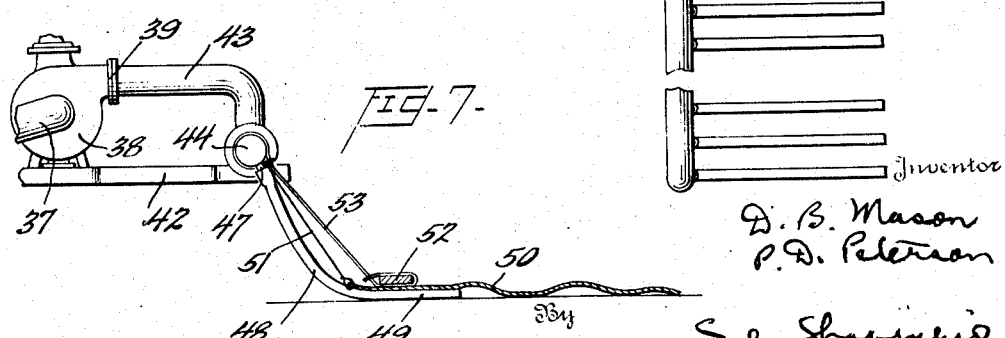

Patented June 30, 1942

2,288,569

UNITED STATES PATENT OFFICE 2,288,569

PROTECTION OF ECONOMIC CROPS

Donald Bentley Mason, Westport, Conn., and Paul Donald Peterson, Highland Park, N. J., assignors to Freeport Sulphur Company, New York, N. Y., a corporation of Delaware Application October 31, 1938, Serial No. 238,058

7 Claims. (Cl. 21—115)

This invention relates to methods and apparatus utilized in the protection of economic crops, and is more particularly concerned with methods and mechanisms enabling the ready application of vapors and gases to growing crops for the elimination of weeds, parasites, etc.

Among the objects of the present invention is the development of novel methods of treating economic crops to reduce or eliminate weed growth.

Other objects include novel methods of application of parasiticides.

Further objects include mechanical structures enabling such methods to be readily carried out.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, in Figure 1, a vertical cross section through a sulphur burner constructed in accordance with the present invention; in Figure 2, a modified form of such sulphur burner; in Figure 3, a sulphur vaporizer constructed in accordance with the present invention; in Figure 4, a section on the line 4—4 of Figure 1; in Figure 5, a side elevational view of a sulphur burner of the character shown in Figures 1-3 of the drawings mounted on a truck; in Figure 6, a plan view of the structure shown in Figure 5; and in Figure 7, a detail of the discharge mechanism including means for restricting the atmosphere in which the vapors and gases discharge when the discharge mechanism operates.

In accordance with the present invention, growing plants, particularly of the nature of economic crops, are protected by direct application thereto in the field of the desired gases and vapors or other materials which are to be applied to the plants for any of various purposes including the restriction of weed growth, or the entire elimination of weeds, the application of parasiticidal compositions, etc. The structures of the present invention enable ready application of the desired material to be made in situ on the growing plants in the field, and such mechanisms also make possible the ready application of gases and vapors or other materials, which have not heretofore been applicable directly to growing plants under field conditions.

In accordance with the present invention, the material to be utilized to treat the plants, or to eliminate weeds, or for other purposes, is converted into a gaseous, vaporous, or mist form, and in said sub-divided condition is applied directly to the plant under field conditions. In accordance with the present invention, the application of sulphur vapors or sulphur dioxide-containing gases applied to the growing plants under field conditions will be utilized to illustrate the present invention, without any intended limitation, since the methods of the present case, and the apparatus and structures enabling such methods to be utilized, may also be employed in the application of any desired type of material that can be readily converted into a gasified condition. The term "sulphurous gases" will be utilized herein to cover sulphur vapors or sulphur dioxide gases or similar materials derived from sulphur.

Sulphurous gases lend themselves readily to utilization for the treatment of plants under field conditions, since such sulphurous gases including both sulphur vapors, and sulphur dioxide-containing gases, may be readily and economically produced and utilized for such purposes. The sulphur dioxide may thus be generated and utilized particularly for the control of weed growth in economic crops, and is particularly useful in reducing or entirely eliminating weed infestation of grain or cereal fields, the sulphur dioxide acting as a general herbicide for the control of weeds. Cereal crops that may thus be treated include barley, etc., but other economic crops such as onions and so on may also be protected in accordance with the present invention. While the sulphur dioxide in such cases acts primarily as a herbicide, it also undoubtedly affects at least a partial control in the prevention or elimination of grain diseases. Among the weeds which may thus be reduced or eliminated by the utilization of such sulphur dioxide, there may be particularly mentioned mustard, wild radish, wild lettuce, Russian thistle, dock, Shepherd's purse, etc. Not only is there a direct elimination of or reduction in the growth of such weeds, but since certain weeds are known to be hosts for parasiticidal insects, the elimination of the weed also eliminates to a large extent the possibility of infestation due to such insects.

While the use of sulphur dioxide is set forth above as illustrative generally of herbicide materials which can be utilized in accordance with the present invention, other parasiticidal compositions may be applied to the growing plants in the field, and the utilization of sulphur in vaporous condition illustrates this phase of the invention. The sulphur is utilized in this way for purposes analogous to those in which sulphur has heretofore been dusted on economic plants.

In the utilization of sulphur vapors or sulphur dioxide-containing gases in the treatment of crops under field conditions, the desired sulphurous gases may be generated in any desired way and applied to the plants. For example, the sulphur may be converted into molten condition and vaporized by the application of substantially non-oxidizing gases blown through or over the molten sulphur to carry vapors away from that material, which sulphur-containing gases may then be deposited in situ on the growing plants. Where sulphur dioxide-containing gases are desired, an oxidizing gas may be blown through or over the molten sulphur at a temperature sufficient to produce oxidation of the sulphur and to generate the sulphur dioxide-containing gases which can then be led to the discharge device for delivery at the plant areas. Of course, any other means for producing the sulphur vapors or sulphur dioxide-containing gases can be employed. Thus sulphur dioxide in liquefied condition supplied in drums can be utilized, and the gases permitted to escape from the drum through a reducing valve in the usual way, but connected to a distributor of the character particularly hereinafter described for application directly to the plants in situ.

In the application of sulphurous gases or other gases and vapors to the plants under field conditions, it is desirable to insure a direct application of the sulphurous or other gases or vapors to the plant areas. For herbicides of the character of sulphur dioxide, it is also desirable to have such herbicide applied under conditions where it will reach the weed plant growing amongst the economic crops. More desirably, therefore, in the utilization of such sulphurous or other gases and vapors, the materials are supplied and delivered to the plants under field conditions in more or less restricted atmospheres. Thus the plants may be temporarily covered as by means of tarpaulins or similar covering elements, and the gases and vapors admitted under the tarpaulins or similar elements, whereby the sphere of action of the sulphurous or other gases and vapors is restricted and controlled, and losses materially reduced. Desirably in such utilizations the application of the sulphurous gases can be made by means of portable devices designed to run through the field containing the economic crops, and the sulphur or sulphur dioxide generators may, therefore, desirably be employed in conjunction with portable tarpaulin or similar element, so that as the tarpaulin or other covering element is drawn across the field, or over portions thereof in which the crops are growing, there is at the same time the application of the vapors and gases of desired treating material.

An economical and simple sulphur burner that can be utilized in accordance with the present invention is illustrated in Figures 1 and 2 of the drawings. In Figure 1, a vertical chamber 1 of columnar type may desirably be utilized having a base 2 and cover 3. The chamber 1 is desirably stacked with a filling material such as fire brick 4, loosely packed therein. The cover 3, desirably carries a hopper 5 hinged thereto, as shown at 6, which hopper serves to retain sulphur or similar material, the bottom 7 of the hopper being perforated to enable molten sulphur or similar material to percolate therethrough onto the fire brick 4, which during operation is maintained at a temperature sufficient to insure the presence of molten sulphur, either to produce sulphur vapors or sulphur dioxide, depending on the conditions as hereinafter explained. The upper portion of the column 1 is provided with a series of openings 8 for the admission of air, a collar 9 protecting such openings being carried by the upper portion of the column. In addition, a shield 10 frictionally engaging against the collar 9 may be utilized to provide by simple means a longer path for travel of the entering air into contact with the walls of the chamber 1, such air under operating conditions being pre-heated by its contact with the walls of the chamber 1, and the degree of pre-heat being controllable by the position of the shield 10. The gases or vapors formed in the chamber 1 may be withdrawn through the discharge outlet 11 to a discharge device hereinafter described.

In the utilization of a sulphur burner of the character shown in Figure 1 for the production of sulphur dioxide-containing gases, the fire brick is desirably heated to a point where the sulphur in the hopper 5 is melted, and drips down over the heated fire bricks. Air entering the chamber through the openings 8, which air may be blown through or drawn through such chamber, in contact with the molten sulphur causes oxidation of the latter with the production of sulphur dioxide-containing gases. Generally the combustion of the sulphur produces sufficient heat to maintain the column at the desired temperature. To initiate the operation, the fire brick may be heated in any desired way, but a simple means is to throw back the hopper to open the column, and then to introduce some charcoal in the upper portion of the column, which charcoal is sprinkled with gasoline or kerosene and ignited. The blower or other device is then started to cause a current of air passing through the column 1, and the heat from the burning charcoal is drawn down through the broken fire brick. The hopper is returned to its normal position, and sulphur dumped into it. The heat from the burning charcoal causes the sulphur to melt and drip over the charcoal and the heated bricks. After being initiated in this way, the sulphur acts both as a source of sulphur dioxide and as the fuel for keeping the fire brick hot, and generally no further charcoal need be used unless the burner is permitted to cool down below the melting point of sulphur. Occasionally it is desirable to supply some additional charcoal from time to time to accelerate the burning rate, particularly during very windy weather, or under cold conditions. The burning rate can also be accelerated by lowering the shield or hood that surrounds the burning tube, so that the air enters within this shield or hood 10 at a lower point, and traveling against the walls of the chamber 1 for a longer distance is heated to a higher temperature before entering the columnar chamber 1.

A modified form of sulphur burner is shown in Figure 2. In this form of device, the chamber consists of a columnar vessel 21, having the base 22 and cover 23, the chamber 21 carrying broken fire brick 24, or similar material. The hopper 25 having the perforated bottom 27 is provided for holding sulphur or similar material. Such hopper may be hinged to the cover 23 in a manner analogous to that described in connection with the device of Figure 1. Openings 28 permit the entry of air into the chamber 21, a collar and shield 29 and 30 respectively being supplied analogous to that described above in connection with the structure of Figure 1. Near the base of the chamber 21, a discharge opening 31 leads to the conduit 32 connecting with a second column 33, the broken fire brick 24 or similar material extending through the conduit 32 into the bottom portion of the second column 33. The second column has a base 34 and cover member 35. The column 33 has a discharge outlet 36 leading to the conduit 37 that connects with the blower 38, discharging through the outlet 39. The utilization of a burner of the character shown in Figure 2 is carried out in substantially the same manner as that described for the burner of Figure 1, so that no further description in this connection is essential.

A burner of the character of that shown in Figure 2 may, however, be readily employed by simple modification for use as a sulphur vaporizer, as illustrated in Figure 3. The only changes necessary in the structure of Figure 2 in order to convert it into the sulphur vaporizer illustrated in Figure 3 is to provide an open ended hopper 40 for the first columnar chamber 21, and a sulphur type hopper 41 for the second columnar chamber 33. In this event, charcoal is continuously supplied through the hopper 40 into the upper portion of the columnar changer 21, and initially ignited in the manner set forth above in describing the operation of the sulphur burner of Figure 1, so that the air drawn into the chamber 21 through the opening 28 is utilized for causing combustion of the charcoal maintained in column 21, which thereby maintains the temperature of the broken fire brick 24 in the bottom of these columns. The heat of the burning charcoal maintains the temperature desired in the fire brick 24, and such combustion also substantially eliminates oxygen from the gases drawn through these columnar chambers. Consequently, the gases entering the second columnar chamber 33 are substantially free from oxygen and do not cause any combustion. The heated fire brick 24 serves to melt the sulphur in the hopper 41, which sulphur then drops onto the heated fire brick 24 in the column 33, and the non-oxidizing gases circulating through the chamber 33 deliver such sulphur vapors with practically no sulphur dioxide through the outlet 36 and conduit 37 to the blower 38 to be discharged through the outlet 39 to any desired distributing device. The utilization of a sulphur burner of the character of Figure 2 enables its ready conversion into a sulphur vaporizer as shown in Figure 3, and consequently where both sulphur burners and sulphur vaporizers are desirable, the form of sulphur burner shown in Figure 2 may be employed in view of the fact that it may be readily converted into a sulphur vaporizer by simple means.

The sulphurous or other gases or vapors that are to be employed, may be applied to the plants or crops in any desired way. Where such gases and vapors are generated by portable devices of the character illustrated and described in Figures 1-3, such devices may be carried on a truck, automobile, or by means of a tractor throughout the field where the plants or crops are to be protected, and the issuing gases or vapors directed upon or into contact with the crops by any desired means. Thus as shown in Figures 5-7, a sulphur burner, such as that shown in Figure 1, may be mounted on the truck 42, carrying the blower equipment also connected by the conduit 37 with the discharge outlet of the burner 1, the blower 38 delivering the vapors and gases through the discharge outlet 39 into the pipe 43 connected to the header 44. The header may be supported in position by means of angle iron channel members 45. The header may be made in several sections as indicated depending on its length. The header is provided with a number of orifices or openings 46 for the reception of nipples 47 through which the gases or vapors from the header are discharged. Desirably, the gases and vapors are passed into flexible tubes 48 attached to the nipples 47, which flexible tubes are elongated and of a length sufficient to rest on the ground as indicated at 49 in Figure 7. The use of such flexible, elongated tubes directs the vapors and gases into direct contact with the plants and surface of the ground directly contiguous thereto. In order to restrict the atmosphere into which such gases and vapors are directed, a tarpaulin 50 may desirably be carried over the discharge ends of the tubular members 48, such tarpaulin 50 being attached as by means of ropes 51 to the header, so that movement of the truck carries the tarpaulin in its relative position with respect to the outlets of the discharge tubes 48 throughout the period of treatment. Desirably also a weighted element 52 of a length to extend across the entire bank of discharge tubes 48 may be employed carried by means of ropes 53 attached to the header 44. The weighted element 52 pressing against the tube outlet maintains the tubes in the desired position close to the ground, and also maintains the tarpaulin 50 in position over the ends of the tubular members 48.

The type of distributing element thus referred to and described in connection with Figures 5-7 is particularly useful in maintaining the application of the desired gases and vapors in direct proximity to the plants or crops undergoing treatment, the tarpaulin restricting the atmosphere within which the vapors and gases are applied at the time of treatment, and preventing a loss by too rapid dissemination of the gases and vapors into the surrounding air without direct contact with the plants.

The structures of the present invention enable the methods described herein to be readily carried out and practiced by simple and economical structures directly available for use in the protection of growing crops in situ under field conditions. While the use of sulphur vapors or sulphur dioxide-containing gases is particularly emphasized, and give particularly important results in the protection of crops against insects and parasitic fungi, and materially restrict or entirely eliminate weed growth, these methods and structures may be utilized for the dissemination of other vapors and gases and other materials desired into contact with plants under growing conditions prevailing in the field.

The present methods and devices lend themselves to the utilization of any desired parasiticidal, insecticidal, fungicidal or other treating material for application to plants. While sulphur-containing materials, such as vaporized sulphur and sulphur dioxide containing gases have been particularly referred to above, these methods and devices can also be utilized in the dissemination of nicotine, either by itself or in combination with sulphur as, for example, by merely permitting the desired nicotine material to drip into the second column of the sulphur vaporizer. If nicotine alone is dripped into this column, then nicotine vapors will, of course, be formed, whereas if both nicotine and sulphur are admitted to the sulphur vaporizer, mixed vapors of those materials will be produced. Similarly naphthalene or sulphur-naphthalene mixtures may be utilized by the disclosed methods and devices in the treatment of plants.

While the method particularly lends itself for utilization for parasiticidal purposes, it has a variety of other uses which apply both to the methods and the devices set forth herein. For example, defoliation may be artificially carried out by the utilization of the methods and devices set forth herein. Early defoliation is sometimes desired, particularly in nurseries, and the methods and devices of the present invention particularly lend themselves to such utilization. Such defoliation carried out in accordance with the present invention avoids the difficulties that arise in attempted use with liquid sprays.

Furthermore, the methods of the present invention may be utilized in connection with the treatment of weeds where no growing crop is involved. For example, these methods may be employed for killing weeds on railroad road beds by the application, for example, of sulphur dioxide, desirably utilized under such conditions as to kill all plants to the ground level. For these purposes, it is desirable to increase the intensity or the duration of the treatment, or both, as compared with the conditions of differential kill employed where weeds are being destroyed in a grain field. In explanation of this, it may be pointed out that where for purposes of a differential kill, the truck may travel at the rate of approximately one mile per hour, burning sulphur at the rate of approximately 30 pounds per hour, and using a canvas drag 20 x 20 feet, under which conditions, such common weeds as Polygonum, Amaranthus, Chenopodium, *Stellaria media*, and several species of wild mustard may be killed without permanent damage to such crops as barley, oats, rye and wheat. Where, however, plant kill is desired, as along railroad tracks and in analogous places, the intensity of the kill may be increased by various expedients as, for example, by repetition of the treatment, or by increasing the rate of burning sulphur, or by traveling at a slower rate of speed, or by increasing the length of the canvas drag, or by any desired combination of such factors. By the utilization of such methods, a substantially complete kill of all the exposed parts of plants above the ground level may be obtained, whereas on the other hand by making the treatment less drastic, the more sensitive plants out of a mixed population of growing plants may be eliminated. The method, therefore, readily lends itself to the use of a herbicide for eradicating weedy growth, as well as to the other utilizations set forth above.

A particularly important feature of the present invention is the fact that it lends itself to continuous use. The devices and methods of the present invention instead of being limited to batch application, although of course they may be utilized as batch processes, enable continuous operation to be carried out in that the treating material may be continuously supplied to the vaporizer or burner, and the corresponding vapors generated for treatment of the plants, particularly in situ.

Having thus set forth our invention, we claim:

1. A device capable of being portably mounted on a vehicle for delivering sulphurous gases to growing plants comprising a column, a filling material in said column, means for heating said filling material, a hopper for sulphur in heat exchange relation with said column whereby sulphur melted in said hopper by heat from the filling material may flow onto said heated filling material, and means for delivering sulphurous gases from said column.

2. A device capable of being portably mounted on a vehicle for delivering sulphurous gases to growing plants comprising a chamber for burning charcoal, a second chamber into which sulphur may be introduced, a hopper for sulphur in heat exchange relation with said second chamber and communicating therewith, a filling material in said second chamber, means for passing heated gases from the first chamber into the second chamber to heat the filling material therein whereby sulphur is melted and flows from said hopper into said second chamber, and means for discharge of sulphurous gases from the second chamber.

3. Apparatus capable of being portably mounted on a vehicle for generating sulphurous gases which comprises a container carrying refractory material, means for heating said refractory material, a hopper for sulphur in heat exchange relation with said container whereby sulphur melted in said hopper by heat from the refractory material may flow onto said refractory material, means for directing a gaseous stream therethrough to remove sulphurous gases, and means for discharging said sulphurous gases.

4. A device capable of being portably mounted on a vehicle for delivering sulphurous gases to growing plants comprising a column, a filling material in said column, means for heating said filling material, a sulphur hopper removably mounted atop said column to form a closure therefor, the bottom of said hopper communicating with the column whereby sulphur melted in said hopper by heat from the filling material may flow onto the filling material, and means for delivering sulphurous gases from said column.

5. In a portable device mounted on a vehicle for delivering sulphurous gases to growing plants in the field, a column, a filling material in said column, means for heating said filling material, a hopper hingedly mounted atop said column to form a closure therefor, the bottom of said hopper having openings permitting communication between the hopper and the column whereby sulphur melted in said hopper by heat from the filling material may flow onto the filling material, and means for delivering sulphurous gases from said column.

6. In a portable device capable of being mounted on a vehicle for delivering sulphur vapors to growing plants in the field, a container, refractory material in said container, means for heating said refractory material, a hopper for sulphur in heat exchange relation with said container whereby sulphur melted in said hopper by heat from the refractory material may flow onto said refractory material, means for directing a stream of non-oxidizing gases through the container to remove sulphur vapors, and means for discharging said sulphur vapors.

7. In a portable device capable of being mounted on a vehicle for delivering sulphur dioxide gases to growing plants in the field, a container, refractory material in said container, means for heating said refractory material, a hopper for sulphur in heat exchange relation with said container whereby sulphur melted in said hopper by heat from the refractory material may flow onto said refractory material, means for directing a stream of oxidizing gases through the container to form and remove sulphur dioxide gases, and means for discharging said sulphur dioxide gases.

DONALD BENTLEY MASON.
PAUL DONALD PETERSON.